United States Patent Office 2,830,089
Patented Apr. 8, 1958

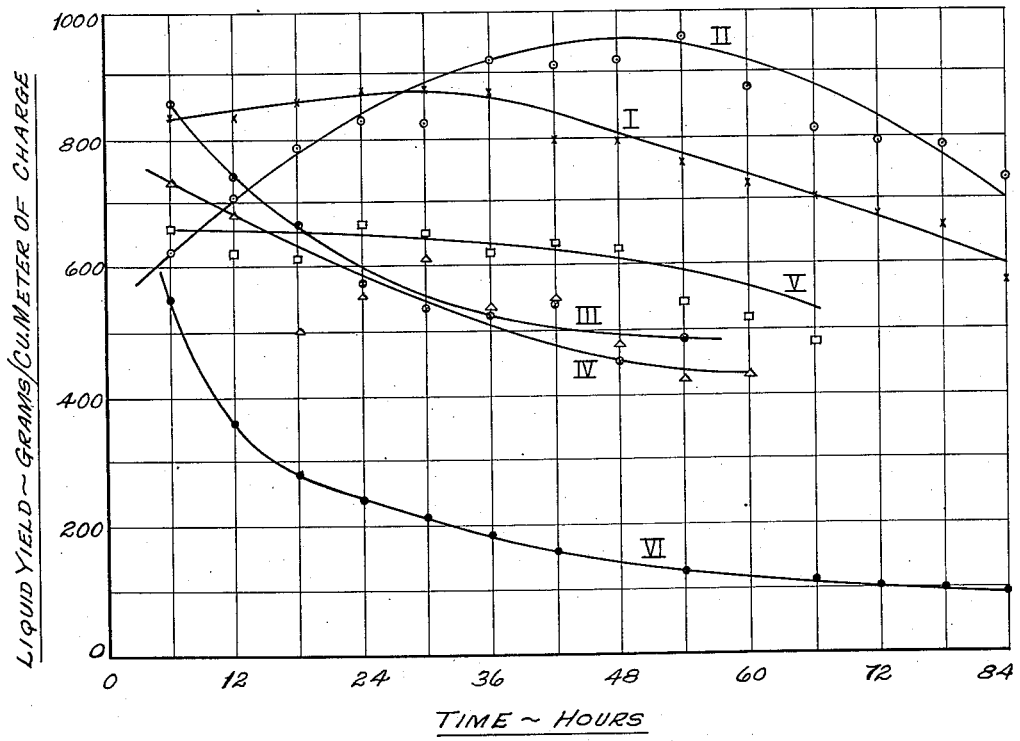

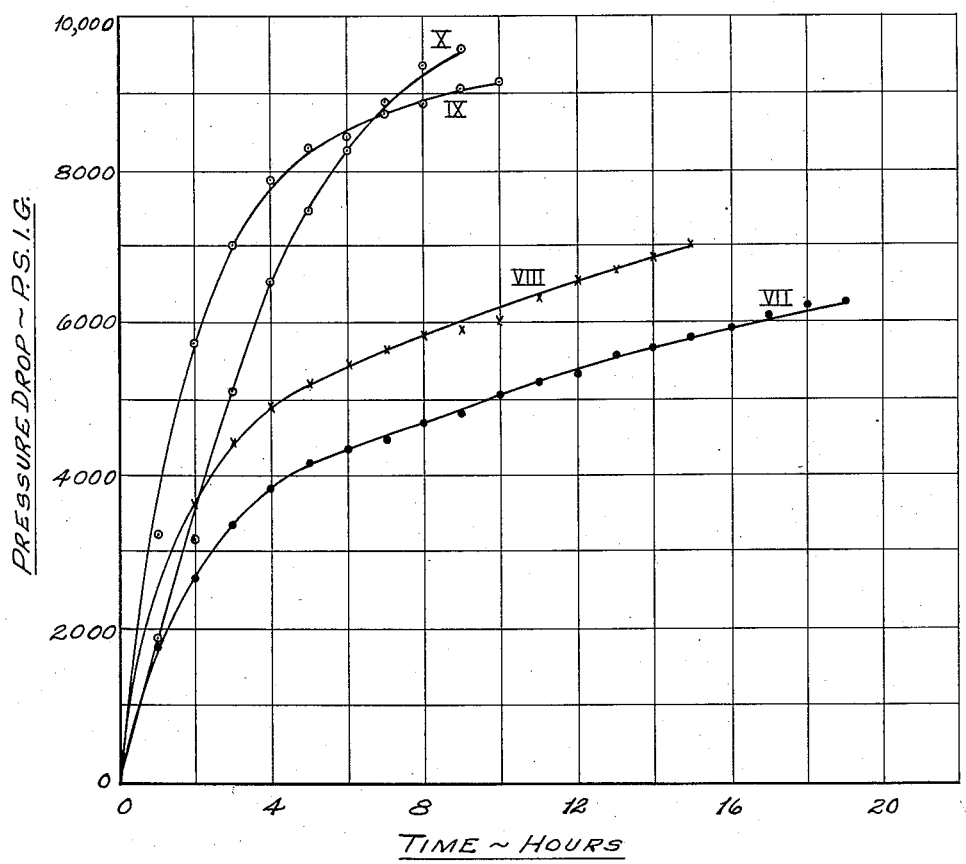

2,830,089

CATALYSTS FOR ELEVATED PRESSURE-MODERATE TEMPERATURE REACTIONS OF CARBON MONOXIDE

James W. Fitzwilliam, Beacon, Ernest A. Naragon, Glenham, and Frank J. Moore, Wappingers Falls, N. Y., assignors to The Texas Company, New York, N. Y., a corporation of Delaware Application November 7, 1951, Serial No. 255,298

1 Claim. (Cl. 260—597)

This invention relates to novel cobalt catalysts for effecting the reaction of unsaturated compounds with carbon monoxide at elevated pressure and moderate temperatures. The novel catalysts of this invention are particularly useful in the reaction of olefinic compounds with carbon monoxide and hydrogen to produce carbonylic compounds.

The present application is a continuation-in-part of Serial Nos. 111,486 and 116,668, which were filed respectively on August 20, 1949, and September 20, 1949, both of which are now abandoned.

Supported cobalt catalysts wherein cobalt is supported on surface-active materials, such as Filter Cel and kieselguhr, have heretofore been employed in the reaction of unsaturated compounds with carbon monoxide at elevated pressure and moderate temperatures. The conversion of olefins, carbon monoxide and hydrogen to carbonylic compounds, a conversion which henceforth will be called the carbonylation reaction, has ordinarily been effected with a Fischer-Tropsch cobalt catalyst comprising 32 percent cobalt, 64 percent Filter Cel, 3 percent magnesia and 1 percent thoria; hereafter a supported catalyst of this composition will be designated a standard cobalt catalyst. The use of supported cobalt catalysts in the carbonylation reaction is accompanied by a serious drawback, namely, the rapid decline in activity shown by such catalysts. As a consequence of the short catalyst life of supported cobalt catalysts, frequent regenerations were required. This invention discloses novel unsupported promoted cobalt catalysts which not only are substantially more active initially in the carbonylation reaction than conventional supported cobalt catalysts but also possess a longer catalyst life. This invention represents a significant advance in elevated pressure-moderate temperature reaction of unsaturated compounds with carbon monoxide; the improved yields and fewer regenerations attainable with the process of the invention are substantial factors in establishing the commercial feasibility of the carbonylation reaction.

In accordance with this invention, the reaction of carbon monoxide with unsaturated compounds at elevated pressures and moderate temperatures is effected in the presence of an unsupported cobalt catalyst which possesses a critical alkali metal oxide content and is promoted with one or more of the following metal oxides, namely, alumina, magnesia, chromia, beryllia, titanium and calcium oxide. The novel carbonylation catalysts of this invention comprise 50 to 95 weight percent cobalt, 0.01 to 0.4 weight percent alkali metal oxide and 5 to 50 weight percent of one of the aforementioned metal oxide promoters or a mixture thereof. The promoted cobalt catalysts of this invention may also contain 1 to 15 percent of metal oxide activators such as ferric oxide, nickel oxide, thoria or boria. The superior carbonylation catalysts of this invention are particularly sensitive to the prescribed alkali metal oxide content. In order to prepare superior catalysts characterized by high activity and long catalyst life, it is necessary that the alkali metal oxide content of the finished catalyst fall between the limits of 0.01 and 0.4 weight percent.

The novel catalysts of this invention preserve an effective mol ratio of cobalt metal to cobalt oxide in the catalyst during the elevated pressure moderate temperature reaction of unsaturated compounds with carbon monoxide and hydrogen. We have discovered by X-ray analysis that a ratio of cobalt metal to cobalt oxide between 1 and 20 is a prerequisite for attaining and maintaining a high level of activity in cobalt carbonylation catalyst. Apparently the rapid loss in activity shown by former cobalt catalysts, particularly the supported type, is attributable to reduction of cobalt oxide to cobalt metal during the carbonylation reaction with the result that supported catalysts soon lose the required effective ratio of cobalt metal to cobalt oxide. The long catalyst life of the unsupported promoted catalysts of this invention is attributable to the fact that the promoter and the prescribed alkali metal oxide content inhibit reduction of cobalt metal to cobalt oxide so that an effective ratio of cobalt metal to cobalt oxide is preserved for a substantial period during the carbonylation reaction. The cobalt content of catalysts of this invention is at least 5 percent cobalt oxide, even after many hours of use. Analysis of a used catalyst even after more than 80 hours on stream showed the presence of more than 10 percent cobalt oxide in the cobalt.

It is well recognized at the present time that the active catalytic agent in the carbonylation reaction is cobalt carbonyl. The fact that cobalt carbonyl is the active carbonylation catalyst makes the present invention particularly novel and unexpected. It appears logical to expect that supported catalysts wherein the metal is distributed in thin layers on a supporting material of a large surface area are a better source of cobalt carbonyl because of the availability of the cobalt to carbon monoxide than unsupported catalysts of the prescribed composition wherein the metal is present in dense aggregates. Apparently, cobalt is more accessible for the formation of cobalt carbonyl when cobalt oxide is present in the novel catalysts of this invention during their employment in the carbonylation reaction. The superior activity and longer life of unsupported cobalt catalysts of the prescribed critical composition will be demonstrated hereafter.

The reaction of unsaturated compounds such as olefins with carbon monoxide and hydrogen is ordinarily effected at pressures above 150 pounds per square inch, and preferably between 300 and 5000 pounds per square inch. Reaction of liquid olefins with carbon monoxide and hydrogen in a slurry system is ordinarily effected at pressures between about 1500 and 3000 pounds per square inch. Reaction of gaseous olefins, such as ethylene and propylene are often effected at lower pressures between 300 and 1500 pounds per square inch.

Moderate temperatures are prescribed for the carbonylation reaction because temperatures below 400° F. are necessary in order to assure that the primary reaction is the addition of carbon monoxide and hydrogen to olefins rather than the production of liquid hydrocarbons by reaction of carbon monoxide and hydrogen in a Fischer-Tropsch reaction. Preferred temperatures fall within the range of 100 to 300° F.

The promoted catalysts of this invention are applicable to the conversion of low molecular weight olefins such as ethylene and propylene into carbonyl products as well as to the more conventional slurry-type operation ordinarily employed for converting higher molecular weight olefins into carbonyl products. The superiority of the novel promoted catalysts will be demonstrated hereafter in the conversion of ethylene into diethylketone and in the batch slurry conversion of di-isobutylene into a C₉ aldehyde.

The unsupported catalysts of this invention contain between 50 and 95 weight percent cobalt; the preferred catalysts contain 70 to 95 percent cobalt. Cobalt content as used in describing the novel catalysts of this invention includes both cobalt and cobalt oxide; however, in calculating the catalyst composition, it is assumed that the cobalt oxide is completely reduced to cobalt metal. In preparing the catalysts, the ingredients are added on the assumption that complete reduction of cobalt salts to metallic cobalt occurs.

Promoters employable in the novel catalyst of this invention are alumina, chromia, magnesia, beryllia, titania, calcium oxide and mixtures thereof. All of the aforementioned metal oxides inhibit the reduction of cobalt oxide to metallic cobalt during the reaction of an unsaturated compound with carbon monoxide and hydrogen. The novel catalysts may contain 5 to 50 percent promoter but promoter contents between 5 to 30 percent are advantageously employed. Alumina is the preferred promoter.

The prescribed alkali metal oxide content of 0.01 to 0.4 percent is very critical in preparing the superior cobalt catalysts of this invention. If the alkali metal oxide content is greater than 0.4 percent, there is a marked increase in the catalyst activity. In a similar fashion, an alkali metal oxide-free catalyst, prepared by the use of ammonium hydroxide or carbonate to precipitate the cobalt and promoter from solution, exhibits substantially inferior catalyst activity to cobalt catalysts containing the prescribed alkali metal oxide content. Advantageously, the alkali metal oxide content is maintained between 0.05 and 0.3 percent; an alkali metal oxide content of the order of 0.1 percent produces superior-type catalysts for most carbonylation reactions. The prescribed alkali metal oxide content can be obtained by subjecting a catalyst prepared by precipitation with alkali metal hydroxide or carbonate to multiple washings. Ordinarily four washings of the catalyst with a volume of water approximately equal to the volume of water used to dissolve the metal salts during the preparation of the catalyst are sufficient to bring the alkali metal oxide content within the prescribed range.

Detailed procedures for the preparation of the catalyst will be presented hereafter, but in general cobalt in the form of a soluble salt, such as cobalt nitrate and a soluble salt of the metal or metals whose oxides constitute the promoters are dissolved in water in the desired proportions and are precipitated therefrom by the addition of an alkaline solution such as 10 percent sodium hydroxide. After filtration, the precipitate is washed a plurality of times until the catalyst contains between 0.01 and 0.4 weight percent alkali metal oxide. Thereafter the catalyst is dried and pelleted to the desired size. The catalyst is then treated with hydrogen at a temperature between 450 and 750° F.; 24 hours is a convenient period of hydrogen treatment although shorter hydrogen treatment may be employed. It is also possible to calcine the pelleted catalyst prior to hydrogen treatment.

The novel catalysts of this invention may be prepared by a procedure which results in the formation of non-homogeneous type catalysts which possess long catalyst life. Non-homogeneous type catalysts are prepared by co-precipitating the total cobalt content of the catalyst and a portion of the metal oxide promoter by alkali metal hydroxide or carbonate; the remainder of the promoter is incorporated in the catalyst in the form of metal oxide to yield a catalyst containing the prescribed proportions of cobalt and promoter. Multiple washings are used to bring the alkali metal oxide content of the non-homogeneous catalyst within the prescribed critical range. In the preparation of the non-homogeneous modification, cobalt is ordinarily coprecipitated with approximately 20 to 90 percent of the total promoter from a solution of their soluble salts and the remaining promoter is incorporated in the catalyst in the form of metal oxide.

The superiority of the novel catalysts of this invention from the viewpoint of longer catalyst life and increased catalyst activity are demonstrated in Figures 1 and 2 wherein there are compared the yields obtained with a standard cobalt catalyst and with the novel catalysts of this invention.

In Figure 1 the superiority of the novel catalysts of this invention is shown for a gas phase conversion of ethylene, carbon monoxide and hydrogen into a product comprising mainly diethylketone. The yields of liquid product on the basis of grams per cubic meter of 2/1/1 ethylene, CO, hydrogen mixture charged are plotted against time. In Figure 2, there is demonstrated the superiority of the catalysts of this invention for a batch slurry conversion of di-isobutylene into a C₉ aldehyde. In Figure 2 the amount of conversion is expressed as pressure drop in pounds per square inch gauge, which is plotted against time.

In Figure 1, curves I, II, III, IV, and V indicate the results obtained with the novel catalysts of this invention in the catalytic conversion of ethylene, carbon monoxide and hydrogen into principally diethylketone. Curve VI indicates the activity of a supported cobalt catalyst in the same conversion under similar reaction conditions. As is indicated in the legend under Figure 1, curves I and II, indicate the results obtained in diethylketone reaction employing cobalt-alumina catalysts of varying compositions, namely approximately 90 cobalt-10 alumina catalyst and an 80 part cobalt-20 part alumina catalyst, respectively curve III was obtained with a catalyst comprising substantially 90 weight percent cobalt and 10 weight percent chromia. Curve IV indicates the activity of a catalyst comprising approximately 80 percent cobalt, 10 percent alumina and 10 percent ferric oxide. Curve V shows the activity of a non-homogeneous catalyst comprising about 54 parts cobalt and 46 parts promoter. Curve VI illustrates the activity of a supported standard cobalt catalyst comprising about 32 parts cobalt, 64 parts Filter Cel, 3 parts magnesia and 1 part thoria. It will be noted that the alkali metal oxide content of the superior cobalt carbonylation catalysts of this invention falls within the prescribed range of 0.01 to 0.4 percent.

All of the runs shown in Figure 1 were made in accordance with the conditions disclosed in copending application, Serial No. 141,603, filed January 31, 1950, now U. S. Patent 2,699,453, of E. A. Naragon, J. H. Vergilio and A. J. Millendorf wherein a process was disclosed for canalizing the reaction between ethylene, carbon monoxide and hydrogen to produce mainly diethylketone. The catalysts were all evaluated at similar reaction conditions. These conditions may be briefly summarized as follows: Ethylene, carbon monoxide and hydrogen in a mol ratio of 2/1/1 were introduced at a space velocity of about 100 volumes of reactant mixture per volume of catalyst per hour into a reaction zone containing the catalyst which had been treated with hydrogen at 600° F. prior to being placed in the reaction zone in the form of a fixed bed of dense particles of approximately 10 to 20 mesh; the reaction zone was maintained at a pressure of 300 pounds per square inch and at a temperature of 150° F. by indirect heat exchange.

The superiority of the unsupported promoted catalysts of this invention over supported cobalt catalysts as exemplified by the standard Fischer-Tropsch catalyst is readily apparent from an inspection of Figure 1. Not only is the initial activity substantially greater but the life of the novel promoted catalysts of this invention is outstandingly superior. For example, after 84 hours on stream, 700 grams of liquid product per cubic meter of charge was still being obtained with an 80Co-20Al₂O₃ catalyst is illustrated in curve II, whereas after a similar time on stream only 100 grams of liquid product per cubic meter of charge gas was obtained with a standard cobalt catalyst as illustrated in curve VI.

In Figure 2, the superiority of the catalysts of this invention over supported cobalt catalysts is demonstrated for the batch slurry reaction of di-isobutylene with carbon monoxide and hydrogen to produce a nine-carbon aldehyde. The efficiency of the catalysts is illustrated by the pressure drop in pounds per square inch gauge. Curves VII and VIII show the pressure drop obtained in units of time with a standard cobalt catalyst comprising about 32 parts cobalt, 64 parts Filter Cel, 3 parts magnesia and 1 part thoria. Curves IX and X indicate the activity of a novel catalyst of this invention containing approximately 90 weight percent cobalt and 10 weight percent alumina.

The runs in Figure 2 were all made under similar operating conditions which are briefly summarized as follows: Di-isobutylene and a mixture of 1/1 CO—$H_2$ were charged to a pressure vessel maintained at a temperature of 300° F. The reaction vessel was maintained at a pressure of 1500 to 2500 pounds per square inch gauge throughout the reaction by intermittent repressuring with 1/1 CO—$H_2$ mixture.

Figure 2 establishes the superiority of the novel catalysts of this invention for the carbonylation of liquid olefins by slurry operation. After only approximately four hours on stream the novel catalysts of this invention effected as much carbonylation as measured by the pressure drop, as was effected by a standard cobalt catalyst after approximately twenty hours on stream. The superiority of catalysts of this invention is of such magnitude that substantial economies in commercial adaptation of the carbonylation process are realized by employing the catalyst of this invention.

The preparation of the novel catalysts of this invention is illustrated by the detailed preparations of the 90Co-10$Al_2O_3$-0.12$Na_2O$ catalyst whose activity is illustrated in curve I of Figure 1. 1730 grams of Co($NO_3$)$_2$·6$H_2O$ and 283 grams of Al($NO_3$)$_3$·9$H_2O$ were dissolved in 5 liters of water to which 5100 cc. of 10 percent sodium hydroxide was added slowly with agitation until the system was faintly pink to phenolphthalein. The precipitate thereby obtained was filtered and the filtrate was found to give no precipitate with Na$H_2PO_4$. After washing four times with 5 liters of water at each wash, the precipitate was dried on a steam bath. Thereafter the precipitate was sieved to 14 mesh, pelleted in a ½" die and broken up into 10 to 20 mesh pellets. As indicated heretofore, the catalysts were treated with hydrogen at 660° F. prior to use.

The preparation of the non-homogeneous type catalysts of this invention is illustrated by the detailed preparation of a 54 cobalt-46 alumina-0.1$Na_2O$ catalyst whose activity is illustrated in curve V of Figure 1. This catalyst was prepared by mixing 60 percent coprecipitated 90-10Co-$Al_2O_3$ with 40 percent commercially available $Al_2O_3$. 1730 grams of Co($NO_3$)$_2$·6$H_2O$ and 283 grams of Al($NO_3$)$_3$·9$H_2O$ were dissolved in 5 liters of water to which was added with thorough mixing 259 grams of powdered alumina. 510 cc. of 10 percent sodium hydroxide was added slowly with agitation until the system was faintly pink to phenolphthalein. The precipitate, comprising powdered alumina and coprecipitated cobalt-alumina, was filtered and the filtrate was found to give no precipitate with Na$H_2PO_4$. After washing ten times with 5 liters of water with each washing, the precipitate was dried in a steam bath. Thereafter the precipitate was sieved to 14 mesh and pelleted in a ½" die and broken up into 10 and 20 mesh pellets. The 10 to 20 mesh pellets were calcined at 750° F. for 6 hours. This catalyst was treated with hydrogen at 660° F. prior to use.

The critical nature of the alkali metal oxide content of the unsupported catalysts of this invention is established by the results obtained with a 90 cobalt-10 alumina catalyst which is free from alkali metal oxide and with a 90 cobalt-10 alumina catalyst containing an alkali metal oxide content of approximately 0.6 percent. When these catalysts were evaluated in the conversion of ethylene, carbon monoxide and hydrogen into a liquid product comprising mainly diethyl ketones employing the conditions at which the catalysts shown in Fig. 1 were evaluated, specifically, a temperature of 150° F., pressure of 300 p. s. i. g. and a space velocity of about 100, substantially inferior yields of liquid product comprising mainly diethyl ketones were obtained than with a 90 cobalt-10 alumina-0.12 sodium oxide catalyst. An alkali metal oxide-free 90–10 cobalt alumina catalyst which was prepared by coprecipitating cobalt and alumina from a solution of their soluble salts with ammonium hydroxide gave a liquid yield of 447 grams per cubic meter of charge after 6 hours of operation. The 90–10 cobalt alumina catalyst containing 0.61 percent alkali metal oxide which was only washed twice after coprecipitation of the cobalt and alumina with sodium hydroxide, produced only 40 grams of liquid per cubic meter of charge after 6 hours of operation. A comparison of these yields with the 840 grams yield obtained with the 90–10 cobalt-alumina catalyst containing 0.12 percent alkali metal oxide as shown by curve I of Fig. 1 definitely establishes the critical nature of the alkali metal oxide content of the novel catalysts of this invention.

The foregoing examples are merely illustrative of the novel catalysts of this invention. Cobalt may be promoted with magnesia, beryllia, titania and calcium oxide as well as alumina and chromia. Activators, such as nickel oxide, thoria and boria can be employed in place of ferric oxide. Moreover, the novel catalysts of this invention are applicable to all carbonylation reactions involving the reaction of olefins, carbon monoxide and hydrogen to form carbonyl compounds and to all elevated pressure and moderate temperature reactions of unsaturated compounds, such as nitriles and dienes, with carbon monoxide either in the presence or absence of hydrogen.

Obviously, many modifications and variations may be made in the invention as above set forth without departing from the spirit and scope thereof and therefore only such limitations should be imposed as are indicated in the appended claim.

We claim:

A method of preparing olefin carbonylation products which comprises reacting carbon monoxide, hydrogen and an olefin at a pressure between 150 and 5,000 p. s. i. g. at a temperature between 100 and 400° F. in the presence of a solid composite catalyst, said catalyst consisting essentially of 50 to 95 weight percent cobalt including both cobalt metal and cobalt oxide, 0.01 to 0.4 weight percent alkali metal oxide, and 5 to 50 weight percent of promoter selected from the group consisting of alumina, magnesia, chromia, titania, beryllia, calcium oxide and mixtures thereof.

References Cited in the file of this patent

UNITED STATES PATENTS

| | | |
|---|---|---|
| 1,271,013 | Bosch et al. | July 2, 1918 |
| 1,995,274 | Eversole | Mar. 19, 1935 |
| 2,219,042 | Heckel et al. | Oct. 22, 1946 |
| 2,461,147 | Davies et al. | Feb. 8, 1949 |
| 2,464,916 | Adams et al. | Mar. 22, 1949 |
| 2,491,915 | Barrick et al. | Dec. 20, 1949 |
| 2,520,181 | Teter et al. | Aug. 29, 1950 |
| 2,578,144 | McMillan | Dec. 11, 1951 |
| 2,583,254 | Clark | Jan. 22, 1952 |

U. S. DEPARTMENT OF COMMERCE
PATENT OFFICE

CERTIFICATE OF CORRECTION

Patent No. 2,830,089                                      April 8, 1958

James W. Fitzwilliam et al.

It is hereby certified that error appears in the printed specification of the above numbered patent requiring correction and that the said Letters Patent should read as corrected below.

Column 3, line 27, for "increase" read --decrease--.

Signed and sealed this 20th day of May 1958.

(SEAL)
Attest:
KARL H. AXLINE
Attesting Officer

ROBERT C. WATSON
Commissioner of Patents